US006761460B2

(12) United States Patent
Yang

(10) Patent No.: US 6,761,460 B2
(45) Date of Patent: Jul. 13, 2004

(54) DISPLAY APPARATUS OF AUDIO/VIDEO PLAYER OR THE LIKE

(75) Inventor: Tony Yang, Taichung (TW)

(73) Assignee: Sekaku Electron Industry Co., Ltd., Taichung (TW)

( * ) Notice: Subject to any disclaimer, the term of this patent is extended or adjusted under 35 U.S.C. 154(b) by 0 days.

(21) Appl. No.: 10/136,421

(22) Filed: May 2, 2002

(65) Prior Publication Data

US 2003/0206407 A1 Nov. 6, 2003

(51) Int. Cl.[7] ............................ F21V 7/04; G01D 11/28

(52) U.S. Cl. ............................ 362/31; 362/23; 362/26; 362/27

(58) Field of Search ............................ 362/31, 23, 26, 362/27

(56) References Cited

U.S. PATENT DOCUMENTS 5,394,308 A * 2/1995 Watanabe et al. ............. 362/31
5,408,387 A * 4/1995 Murase et al. ................ 362/31
5,883,684 A * 3/1999 Millikan et al. .............. 349/65
6,139,162 A * 10/2000 Masaki ........................ 362/31

* cited by examiner

*Primary Examiner*—Stephen Husar
*Assistant Examiner*—James Cranson
(74) *Attorney, Agent, or Firm*—Browdy and Neimark, P.L.L.C.

(57) ABSTRACT

A display apparatus adapted to be mounted on an audio/video player or the like comprises a housing having a window. A backlight unit having a plate mounted in said housing and made of transparent materials which has a front surface and a back surface, and a plurality of reflecting pieces disposed on the back surface of said plate and being gradually enlarged by distance. A light set has a LED arranged beside the plate of the backlight unit nearby said the reflecting pieces of smaller sizes to emit light to the backlight unit and reflected by the reflecting pieces to the front surface of the plate. A screen is mounted in the housing and disposed in front of the front surface of the backlight unit corresponding in location to the window of the housing, the screen is capable of passing the light reflected by said backlight unit.

2 Claims, 3 Drawing Sheets

DISPLAY APPARATUS OF AUDIO/VIDEO PLAYER OR THE LIKE

FIELD OF THE INVENTION

The present invention relates to an audio/video player or the like, and more particularly to the display apparatus of an audio/video player.

BACKGROUND OF THE INVENTION

A conventional display apparatus on the audio player, video player or the like usually provides lights on two lateral opposite sides of a screen for user can read the information shown on the screen easier in dark environment. However, the lights of such a design do not provide uniform luminance on the screen, which means the screen has higher illumination at the areas closing to the lights and poor illumination at the areas away from the lights.

A solution to fix the problem as described above is to provide more lights. But the cost will increase a lot and the screen still has poor illumination at the central area.

SUMMARY OF THE INVENTION

The primary objective of the present invention is to provide a display apparatus, which can provide uniform luminance on the screen.

Another objective of the present invention is to provide a display apparatus, which has a simpler structure to take less space and save power.

According to the objectives of the present invention, a display apparatus, which is mounted on an audio player, video player or the like, comprises a housing having a front cover and a window. A backlight unit having a plate mounted in said housing and made of transparent materials which has a front surface and a back surface, a plurality of reflecting pieces disposed on the back surface of said plate and arranged as the smaller sizes thereof locating at a side and being gradually enlarged as the distanced from said reflecting pieces of smaller sizes is increased. A light set has a LED arranged beside the side of said plate of the backlight unit nearby said reflecting pieces of smaller sizes to emit light to the backlight unit and reflected by said reflecting pieces through the front surface of the plate. A screen is mounted in the housing and disposed in front of the front surface of the backlight unit corresponding in location to the window of the housing. The screen is capable of passing the light reflected by said backlight unit.

According to the preferred embodiment of the present invention, the display apparatus further comprises a light-spreading piece disposed between the front surface of the backlight unit and the screen. The light-spreading piece has a piece body and a mist layer on the piece body.

DETAILED DESCRIPTION OF THE INVENTION

Figure 1:
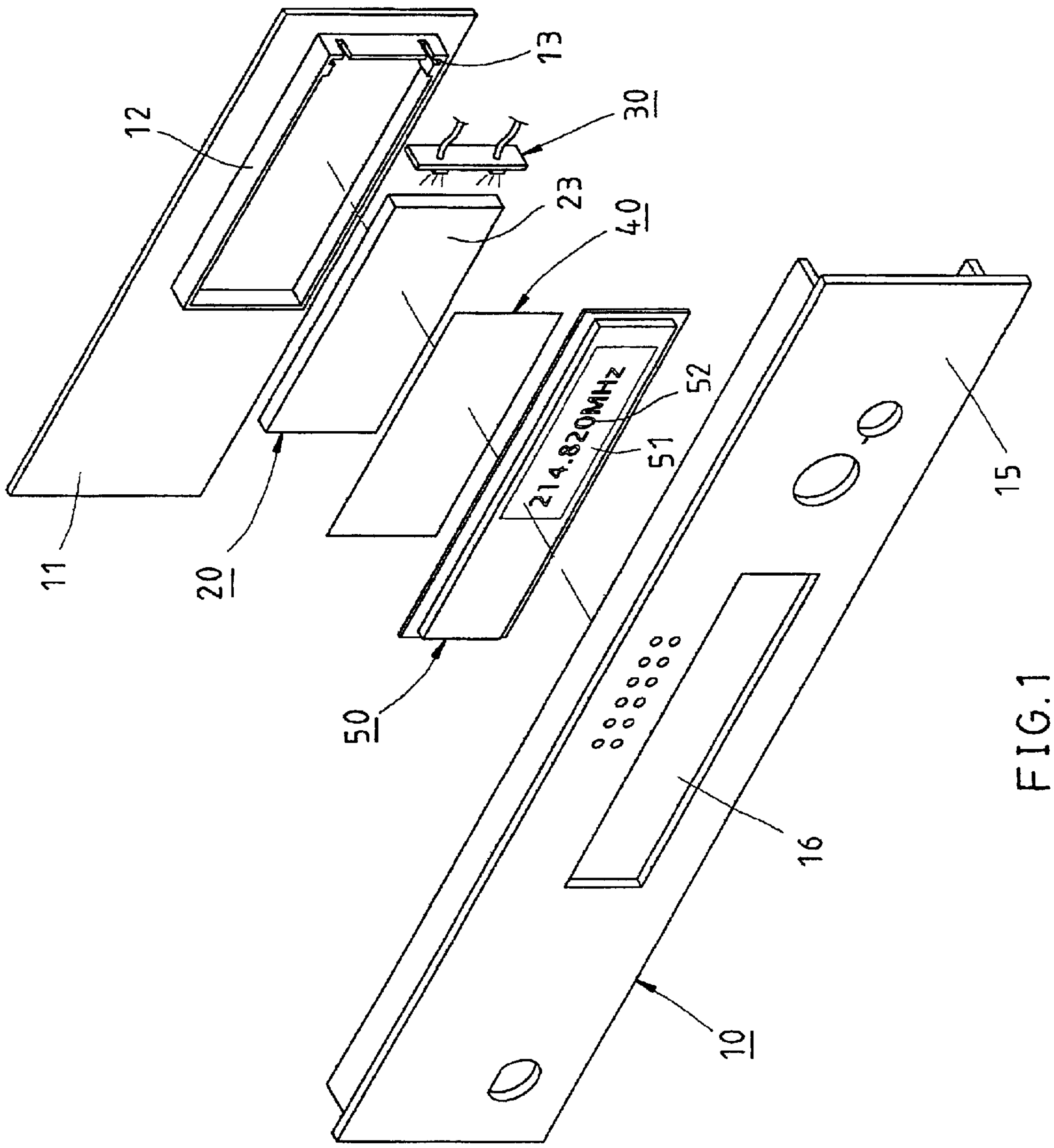
FIG. 1 is an exploded view of a preferred embodiment of the present invention.
Figure 2:
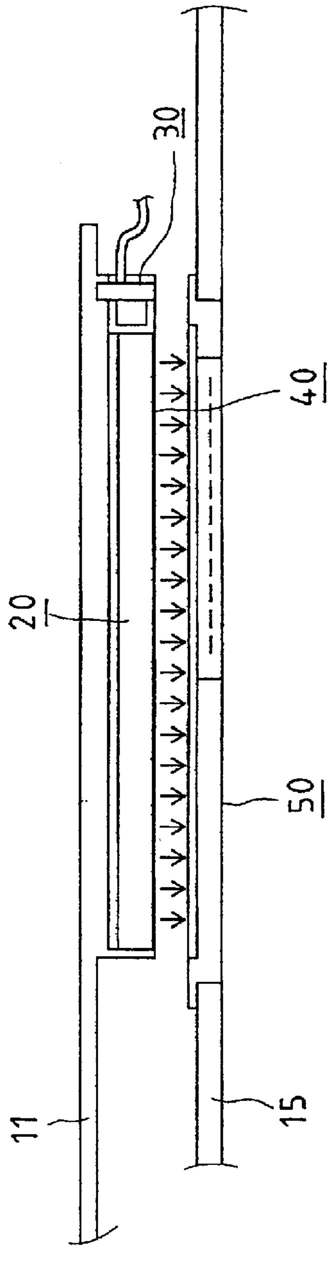
FIG. 2 is a sectional view of the preferred embodiment of the present invention in combination.
Figure 3:
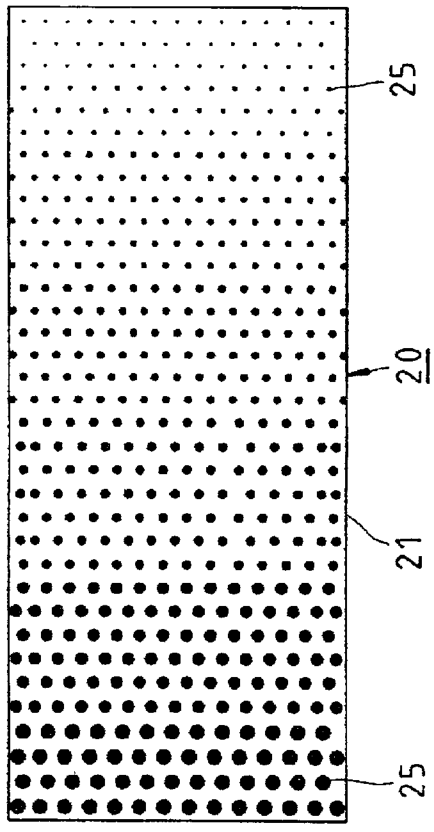
FIG. 3 is a front view of the backlight unit of the preferred embodiment of the present invention.
Figure 5:
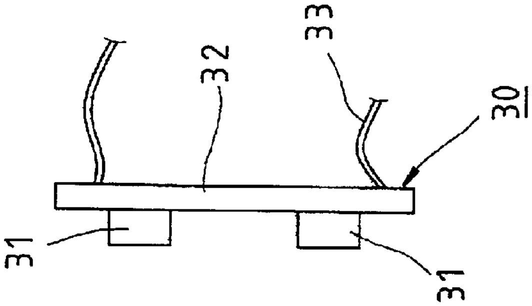
FIG. 5 is a front view of the light set of the preferred embodiment of the present invention.
Figure 4:
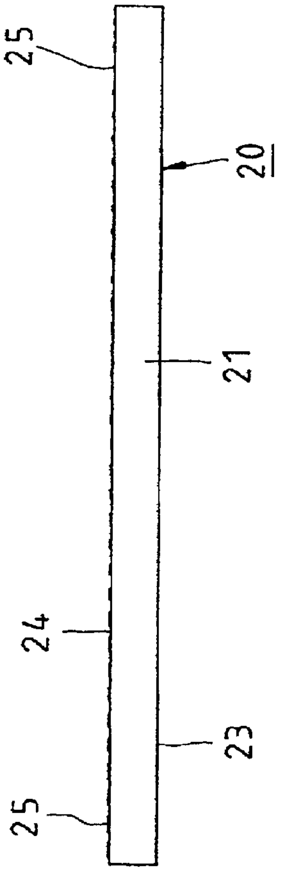
FIG. 4 is a top view of the backlight unit of the preferred embodiment of the present invention.

Please refer to FIGS. 1–5, a preferred embodiment of the present invention provides a display apparatus , which is mounted on an audio player, a video player or the like, comprises:

A housing 10 has a back seat 11 and a front cover 15. The back seat 11 has a mount portion 12 thereon, which is four walls surrounding a square area on the back seat 11, and a light secured portion 13, which is a socket at a side of the mount portion 12. The front cover 15 has a window 16 thereon.

A backlight unit 20 has a plate 21, which is made of transparent acrylic, to be mounted on the mount portion 12 of the back seat 111 of the housing 10, the plate 21 has a front surface 23 and a back surface 24. A plurality of reflecting pieces 25 with different sizes attached on the back surface 24 of the plate 21 in equal intervals with diameters thereof gradually increased. The reflecting pieces 25 are arranged as the smaller sizes thereof locating at a side of the plate 21 and the larger sizes thereof locating at the opposite side of the plate 21 and being gradually enlarged as the distance from said reflecting pieces of smaller sizes is increased.

A light set 30 has two LEDs (light-emitting diodes) 31 mounted on a light seat 32 and conducting electric power by a wire 33. The light seat 32 is secured in the light secured portion 13 of the back seat 12. The LEDs 31 can emit light to the backlight unit 20 and the light will run through the reflecting pieces 25 of smaller sizes first, and then run to the reflecting pieces 25 of larger sizes such that the light emitted from the LEDs 31 is reflected by said reflecting pieces 25 of the backlight unit 20 through the front surface 23 of the plate 21.

A light-spreading piece 40 is attached on the front surface 23 of the backlight unit 20, which has a piece body 41 and a mist layer 42 disposed on the piece body 41.

A screen 50 is mounted on the front cover 15 at the window 16. Thus, the screen 50 locates beside the light-spreading piece 40. The screen 50 has a display portion 51, which can allow light running through and display textures or icons 52 thereon. The screen 50 is a liquid crystal display (LCD) in this preferred embodiment.

Figure 6:
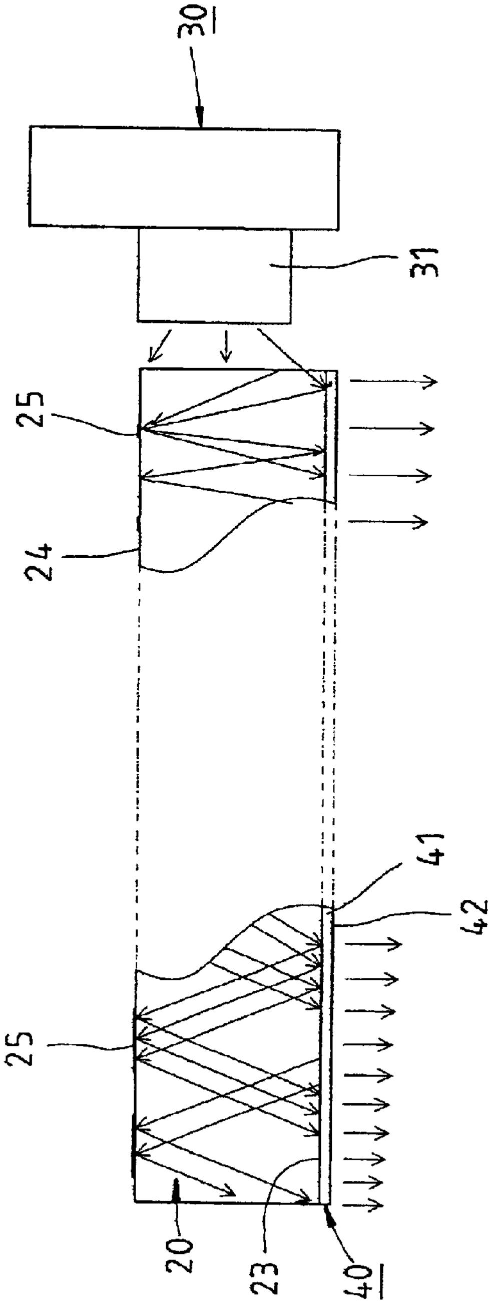
FIG. 6 is a schematic view of the preferred embodiment of the present invention, showing how the reflecting pieces on the backlight unit reflecting light.

Please refer to FIG. 6, the LEDs 31 of said light set 30 emit light into the backlight unit 20 such that the light will be reflected in the backlight unit 20 as the arrows shown in FIG. 6. Some light will be reflected by the reflecting pieces 25 to run out of the backlight unit 20, pass through the light-spreading piece 40 and illuminate the screen 50.

It is easy to understand that how much of the light reflected to illuminated the screen 50 is corresponding to the areas of the reflecting pieces 25 of the backlight unit 20. The reflecting pieces 25 nearby the side which is closing to the LEDs 31, will reflect less light because of the total area of the reflecting pieces 25 is smaller, but the emitted light of the LEDs 31 at this side has higher illumination. On the contrary, the reflecting pieces 25 which is away from the LEDs 31, will reflect more light because of the total area of the reflecting pieces 25 is larger, but the emitted light of the LEDs 31 at this side has lower illumination. The result will make the screen 50 having a uniform illumination.

The light-spreading piece 40 is to smooth the light illuminating the screen 50 to prevent glare. Thus, user can easy to read the information displayed on the screen 50.

The reflecting pieces 25 also can be attached on a film (not shown in FIG.) and then attach the film on the back surface 24 of the backlight unit 20. This is an alteration of the manufacturer.

The advantages of the present invention are:

1. The reflecting pieces on the backlight unit will reflect light emitted from the LEDs of the light set to illuminate the screen and to provide the screen a uniform illumination.

2. The backlight unit takes less space in the audio player, and more particular, it saves power.

What is claimed is:

1. A display apparatus adapted to be mounted on an audio player, a video player or the like, said display apparatus comprising:

a housing having a front cover and a window disposed on said front cover;

a backlight unit having a plate mounted in said housing and made of transparent materials which has a front surface and a back surface, a plurality of reflecting pieces disposed on the back surface of said plate; said reflecting pieces being arranged as the smaller sizes thereof locating at a side and the larger sizes thereof being gradually enlarged as the distanced from said reflecting pieces of smaller sizes is increased;

a light set having a LED arranged beside the side of said plate of the backlight unit nearby said reflecting pieces of smaller sizes to emit light to said backlight unit such that the light emitted from the LED is reflected by said reflecting pieces of the backlight unit through the front surface of the plate;

a screen mounted in said housing and disposed in front of the front surface of the plate of the backlight unit corresponding in location to the window of the housing, said screen being capable of passing the light reflected by said backlight unit;

a light-spreading piece disposed between the front surface of the plate of the backlight unit and the screen, said light-spreading piece having a piece body and a mist layer on the piece body, wherein said reflecting pieces are adhered to a film that is attached on the back surface of the plate of the backlight unit.

2. The display apparatus as defined in claim 1, wherein said screen is a liquid crystal display.

* * * * *